United States Patent
Hinz

(10) Patent No.: US 10,598,246 B2
(45) Date of Patent: Mar. 24, 2020

(54) STRUT ASSEMBLY WITH COMBINED GAS SPRING AND DAMPER

(71) Applicant: REYCO GRANNING, LLC, Mt. Vernon, MO (US)

(72) Inventor: John A Hinz, Monticello, IN (US)

(73) Assignee: REYCO GRANNING, LLC, Mt. Vernon, MO (US)

( * ) Notice: Subject to any disclaimer, the term of this patent is extended or adjusted under 35 U.S.C. 154(b) by 0 days.

(21) Appl. No.: 15/615,681

(22) Filed: Jun. 6, 2017

(65) Prior Publication Data

US 2018/0347657 A1 Dec. 6, 2018

(51) Int. Cl.
| | | |
|---|---|---|
| F16F 9/092 | (2006.01) | |
| F16F 9/06 | (2006.01) | |
| B60G 13/00 | (2006.01) | |
| B60G 15/12 | (2006.01) | |
| B60G 3/06 | (2006.01) | |

(52) U.S. Cl.
CPC ............... *F16F 9/092* (2013.01); *B60G 3/06* (2013.01); *B60G 13/003* (2013.01); *B60G 13/006* (2013.01); *B60G 15/12* (2013.01); *F16F 9/062* (2013.01); *B60G 2200/142* (2013.01); *B60G 2200/44* (2013.01); *B60G 2202/314* (2013.01); *B60G 2204/128* (2013.01); *B60G 2204/129* (2013.01); *B60G 2204/41* (2013.01); *B60G 2204/416* (2013.01); *B60G 2206/0114* (2013.01); *B60G 2206/124* (2013.01); *B60G 2206/60* (2013.01); *B60G 2206/8207* (2013.01); *B60G 2300/02* (2013.01)

(58) Field of Classification Search
CPC .... F16F 9/092; F16F 9/062; F16F 9/06; F16F 2232/08
See application file for complete search history.

(56) References Cited

U.S. PATENT DOCUMENTS

| | | |
|---|---|---|
| 2,756,071 A | 12/1951 | Riva |
| 3,128,088 A | 4/1964 | Paschakarnis |
| 3,145,985 A | 8/1964 | de Carbon |
| 3,152,665 A | 10/1964 | Dickinson et al. |

(Continued)

FOREIGN PATENT DOCUMENTS

| | | |
|---|---|---|
| DE | 32 02 152 A1 | 8/1983 |
| DE | 10 252 557 A1 | 5/2004 |

(Continued)

*Primary Examiner* — Melanie Torres Williams
(74) *Attorney, Agent, or Firm* — Greer, Burns & Crain, Ltd.

(57) ABSTRACT

A strut assembly including a first cylinder, a second cylinder configured to reciprocally move within the first cylinder, and a damper assembly positioned within the first cylinder. The damper assembly includes a housing having opposing first and second ends, a floating piston in the housing and a damper piston positioned between the floating piston and the first end of the housing. The damper piston divides the housing into first and second chambers, where the first and second chambers include a hydraulic fluid that provides resistance to the movement of the damper piston in the housing. The strut assembly also includes a gas spring in the first and second cylinders, where the gas spring includes a pressurized gas contained within the first and second cylinders.

20 Claims, 10 Drawing Sheets

(56) References Cited

U.S. PATENT DOCUMENTS

| | | | |
|---|---|---|---|
| 3,388,883 A | 6/1968 | Axthammer et al. | |
| 3,399,882 A | 9/1968 | Hausmann | |
| 3,610,604 A | 10/1971 | Terai | |
| 3,762,514 A | 10/1973 | Freitag | |
| 3,794,309 A | 2/1974 | Chrokey et al. | |
| 3,804,443 A | 4/1974 | Komatsu | |
| 3,804,446 A | 4/1974 | Warrener | |
| 3,944,270 A | 3/1976 | Kreuzer | |
| 3,946,284 A | 3/1976 | Dieringer | |
| 4,078,638 A | 3/1978 | Koyama et al. | |
| 4,153,237 A | 5/1979 | Supalla | |
| 4,220,228 A | 9/1980 | Kato | |
| 4,524,844 A | 6/1985 | Williams, Jr. | |
| 4,632,228 A | 12/1986 | Oster et al. | |
| 4,671,392 A | 6/1987 | Wossner | |
| 4,712,775 A | 12/1987 | Buma et al. | |
| 4,718,647 A | 1/1988 | Ludwig | |
| 4,796,871 A | 1/1989 | Bauer et al. | |
| 4,838,392 A | 6/1989 | Miller et al. | |
| 4,846,317 A | 7/1989 | Hudgens | |
| 4,850,461 A | 7/1989 | Rubel | |
| 4,899,853 A | 2/1990 | Hummel | |
| 5,014,966 A | 5/1991 | Wang | |
| 5,058,715 A | 10/1991 | Silberstein | |
| 5,097,929 A | 3/1992 | Spoto | |
| 5,137,124 A | 8/1992 | Wirges | |
| 5,158,267 A | 10/1992 | Pascal | |
| 5,295,563 A | 3/1994 | Bennett | |
| 5,305,860 A | 4/1994 | Rotharmel et al. | |
| 5,392,885 A | 2/1995 | Patzenhauer et al. | |
| 5,476,161 A | 12/1995 | Tang et al. | |
| 5,632,361 A | 5/1997 | Wulff et al. | |
| 5,682,966 A | 11/1997 | Cabrerizo-Pariente | |
| 5,718,418 A | 2/1998 | Gugsch | |
| 5,788,030 A | 8/1998 | Rottenberger | |
| 5,810,128 A | 9/1998 | Eriksson et al. | |
| 5,947,238 A | 9/1999 | Jolly et al. | |
| 5,957,252 A | 9/1999 | Berthold | |
| 5,996,978 A | 12/1999 | Asanuma et al. | |
| 6,019,392 A | 2/2000 | Karlow | |
| 6,032,933 A | 3/2000 | Beck | |
| 6,129,185 A | 10/2000 | Osterberg et al. | |
| 6,131,709 A | 10/2000 | Jolly et al. | |
| 6,135,434 A | 10/2000 | Marking | |
| 6,254,067 B1 | 7/2001 | Yih | |
| 6,260,676 B1 | 7/2001 | Agnihotri et al. | |
| 6,286,642 B1 | 9/2001 | Yi | |
| 6,328,291 B1 | 12/2001 | Marzocchi et al. | |
| 6,336,535 B1 | 1/2002 | Lisenker | |
| 6,340,153 B1 | 1/2002 | Miesner | |
| 6,382,369 B1 | 5/2002 | Lisenker | |
| 6,386,525 B1 | 5/2002 | Stuart | |
| 6,471,018 B1 | 10/2002 | Gordaninejad et al. | |
| 6,494,441 B2 | 12/2002 | Beck et al. | |
| 6,531,799 B1 | 3/2003 | Miller | |
| 6,702,075 B2 | 3/2004 | Hartel | |
| 6,874,603 B2 | 4/2005 | Lisenker et al. | |
| 6,896,109 B2 | 5/2005 | Kelso et al. | |
| 6,910,682 B2 | 6/2005 | Fritz | |
| 6,938,887 B2 | 9/2005 | Achenbach | |
| 6,953,108 B2 | 10/2005 | Anderfaas et al. | |
| 6,959,548 B2 | 11/2005 | Borg et al. | |
| 7,011,191 B2 | 3/2006 | Spicer et al. | |
| 7,066,310 B2 | 6/2006 | Mintgen et al. | |
| 7,124,865 B2 | 10/2006 | Turner et al. | |
| 7,140,601 B2 | 11/2006 | Nesbitt et al. | |
| 7,152,719 B2 | 12/2006 | Knaust et al. | |
| 7,219,881 B2 | 5/2007 | Denk | |
| 7,261,194 B2 | 8/2007 | Fox | |
| 7,273,137 B2 | 9/2007 | Fox | |
| 7,299,908 B2 | 11/2007 | Achenbach | |
| 7,308,976 B2 | 12/2007 | Turner | |
| 7,445,094 B1 | 11/2008 | Henderson et al. | |
| 7,628,259 B2 | 12/2009 | Norgaard et al. | |
| 7,641,028 B2 * | 1/2010 | Fox | B62K 25/04 |
| | | | 188/299.1 |
| 7,806,390 B2 | 10/2010 | Achenbach | |
| 7,900,754 B2 | 3/2011 | Carlson | |
| 8,051,961 B2 | 11/2011 | Azekatsu et al. | |
| 8,104,591 B2 | 1/2012 | Barefoot | |
| 8,240,440 B2 | 8/2012 | Massmann et al. | |
| 8,453,806 B2 | 6/2013 | Battlogg et al. | |
| 8,561,764 B2 | 10/2013 | Battlogg et al. | |
| RE44,609 E | 11/2013 | Robertson | |
| 8,695,765 B2 | 4/2014 | Danek et al. | |
| 8,899,560 B2 | 12/2014 | Allen et al. | |
| 8,944,422 B2 | 2/2015 | Achenbach | |
| 8,960,385 B2 | 2/2015 | Achenbach | |
| 9,328,793 B2 * | 5/2016 | Talavasek | B62K 25/20 |
| 2001/0007297 A1 | 7/2001 | Gramb | |
| 2002/0175035 A1 | 11/2002 | Achenbach | |
| 2003/0127781 A1 | 7/2003 | Fritz | |
| 2003/0234144 A1 | 12/2003 | Fox | |
| 2004/0134730 A1 | 7/2004 | Forster | |
| 2004/0226788 A1 | 11/2004 | Tanner | |
| 2005/0012255 A1 | 1/2005 | Denk | |
| 2005/0150731 A1 | 7/2005 | Hitchcock et al. | |
| 2005/0216098 A1 | 9/2005 | Christensen | |
| 2005/0252330 A1 | 11/2005 | Denk | |
| 2006/0027954 A1 | 2/2006 | Nesbitt et al. | |
| 2006/0231360 A1 | 10/2006 | Chen | |
| 2007/0158927 A1 | 7/2007 | Fox | |
| 2007/0267258 A1 | 11/2007 | Massmann et al. | |
| 2008/0053763 A1 | 3/2008 | Wereley et al. | |
| 2008/0060710 A1 | 3/2008 | Carlson et al. | |
| 2009/0001684 A1 | 1/2009 | McAndrews et al. | |
| 2009/0072512 A1 | 3/2009 | Earle | |
| 2009/0236807 A1 | 9/2009 | Wootten et al. | |
| 2010/0089711 A1 | 4/2010 | Nehl et al. | |
| 2010/0109277 A1 | 5/2010 | Furrer | |
| 2010/0193304 A1 | 8/2010 | Bose et al. | |
| 2015/0183487 A1 * | 7/2015 | Tsai | B62K 25/28 |
| | | | 280/284 |

FOREIGN PATENT DOCUMENTS

| | | |
|---|---|---|
| DE | 103 37 516 A1 | 3/2005 |
| DE | 102006047775 A1 | 4/2008 |
| DE | 10 2012 009 220 A1 | 10/2013 |
| EP | 1 034 383 B1 | 2/2004 |
| EP | 2 085 638 B1 | 5/2011 |
| JP | 56-14637 B2 | 10/2014 |
| WO | 9511392 | 4/1995 |

* cited by examiner

STRUT ASSEMBLY WITH COMBINED GAS SPRING AND DAMPER

BACKGROUND

A shock absorber is a mechanical or hydraulic device designed to absorb and damp shock impulses. These shock impulses are absorbed or dampened by converting the kinetic energy of the shock impulses into thermal energy, which is then dissipated from the housing of the shock absorber.

Shock absorbers are typically separated into a compression chamber and a return chamber by a piston. A damping medium, such as hydraulic oil, is placed in the compression and return chambers and flows between the chambers through orifices in the piston. The size of the orifices in the piston are determined based on the desired dampening force of the shock absorber. In other words, the orifice size determines the pressure drop across the piston, which affects the dampening force provided by the shock absorber.

Accordingly, the pressure drop across the piston determines the pressure ratio of the shock absorber, where the pressure drop can be altered dynamically by having pressure act upon the damping medium. Such pressure can be determined by a pressurizing member mounted in or on the shock absorber body. The pressurizing member is connected to and pressurizes the compression chamber, or both the compression chamber and the return chamber. In operation, the pressurizing member is designed to receive the pressure medium that is displaced by the piston rod, to absorb the changes in damping medium volume caused by temperature differences, and to generate a certain basic pressure in the shock absorber.

In this way, shock absorbers and other dampening devices have been used to absorb shock impulses for vehicles, which are generated when vehicles are driven on uneven roads or terrain. For example, many shock absorbers or struts on vehicles utilize a piston rod that moves up and down in a cylinder to provide oscillation dampening, which provides smoothing of shock impulses that would otherwise be passed to the frame of the vehicle. Such devices typically rely upon springs, such as coil springs, disposed around the body of the shock absorber, to carry the load of the vehicle.

In this configuration, the spring internally controls a valve, where fluid within the body of the shock absorber flows in an opposing direction to the motion of the floating piston back through a two-way valve, as gas in the gas chamber decompresses or compresses in response to external circumstances, and pressure in the fluid chamber lessens or increases to restore equilibrium within the system. However, the load is only partially sustained by the compressed gas, and as a result, the device is effectively non-load-bearing without a spring.

Most shock absorbers either have a mono-tube or a twin-tube configuration. A mono-tube shock absorber includes a single, integral housing with an internal chamber including a hydraulic fluid where the chamber is separated by a floating piston. In this configuration, the chamber does not provide spring action, but rather accommodates the extra hydraulic fluid displaced by the piston rod as it moves downward within the housing during a compression stroke. Since the force created in the chamber is not enough to sustain a vehicle's weight, an external spring, as described above, is commonly added to these shock absorbers to supplement the shortage of force provided by the chamber.

A twin-tube shock absorber includes an outer cylinder and an inner cylinder that moves relative to each other. A piston rod having a piston is positioned in and reciprocally moves with the inner cylinder relative to the outer cylinder. The outer cylinder serves as a reservoir for a hydraulic fluid, such as hydraulic oil. There are fluid valves in the piston and in a stationary base valve, where the base valve controls fluid flow between both cylinders and provides some of the damping force. The valves in the piston control most of the damping in the shock absorber. In another type of twin-tube shock absorber, a gas such as low pressure Nitrogen gas is added to the shock absorber to replace oxygen air, and lessen aeration and performance fade of the hydraulic fluid.

Accordingly, there is a need for a shock absorber that provides a combination of a damping force and a spring force during both compression and extension cycles of the shock absorber.

SUMMARY

The present strut assembly includes a combination of a damper assembly and an internal gas spring that absorb vibrations and shock impulses on the strut assembly.

An embodiment of the present strut assembly is provided and includes a first cylinder, a second cylinder configured to reciprocally move within the first cylinder, and a damper assembly positioned within the second cylinder. The damper assembly includes a housing having opposing first and second ends, a floating piston in the housing and a damper piston positioned between the floating piston and the first end of the housing. The damper piston divides the housing into first and second chambers, where the first and second chambers include a hydraulic fluid that provides resistance to the movement of the damper piston in the housing. The strut assembly also includes a gas spring in the first and second cylinders, where the gas spring includes a pressurized gas contained within the first and second cylinders.

Another embodiment of the present strut assembly is provided and includes a vehicle suspension including a frame and a wheel assembly associated with the frame, and a strut assembly attached to the frame and the wheel assembly. In this embodiment, the strut assembly includes a first cylinder, a second cylinder configured to reciprocally move within the first cylinder, a damper assembly positioned within the second cylinder, and a gas spring in the first and second cylinders, where the gas spring includes a pressurized gas contained within the first and second cylinders.

DETAILED DESCRIPTION

Figure 1:
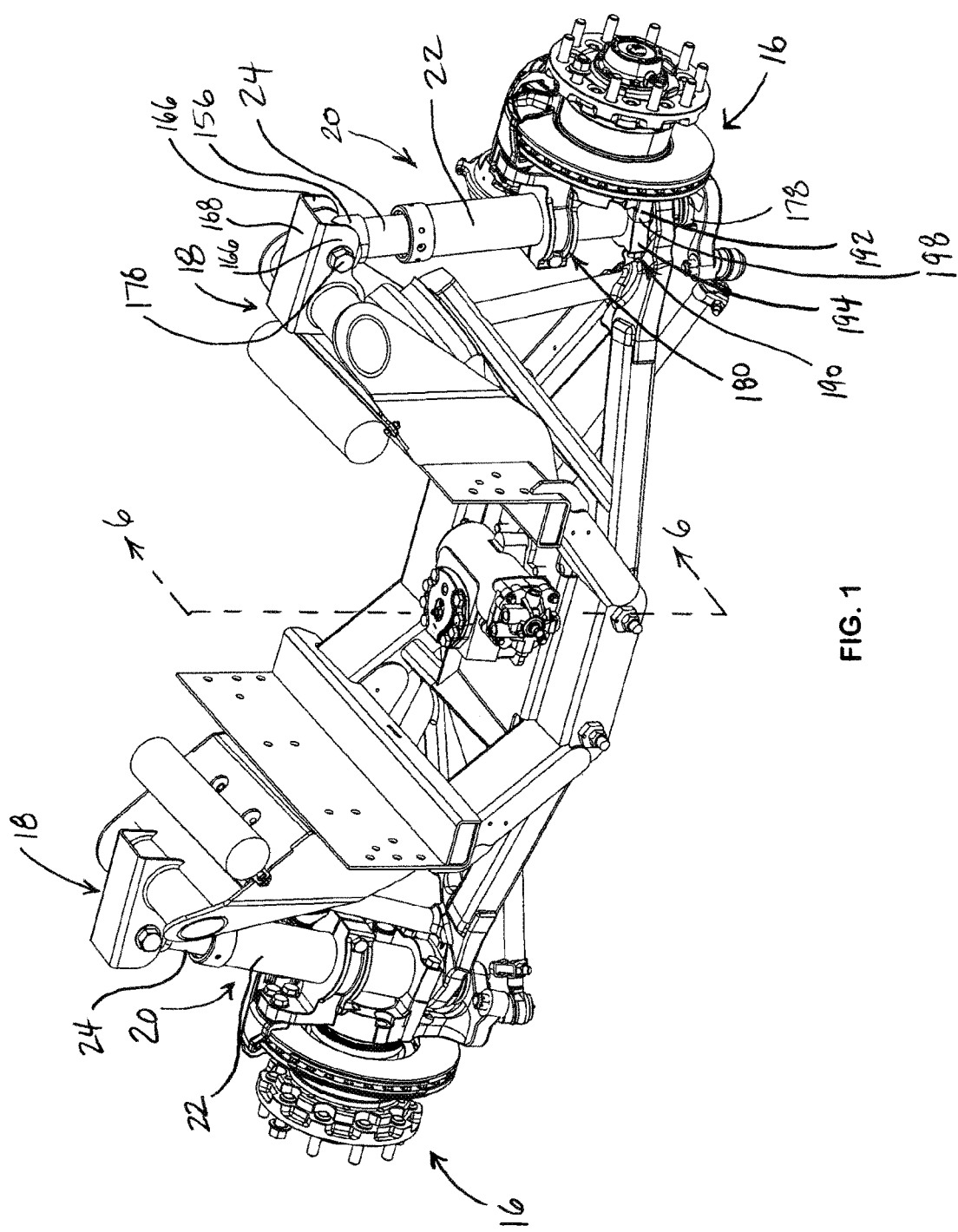
FIG. 1 is a perspective view of a vehicle suspension including the present strut assembly.
Figure 2:
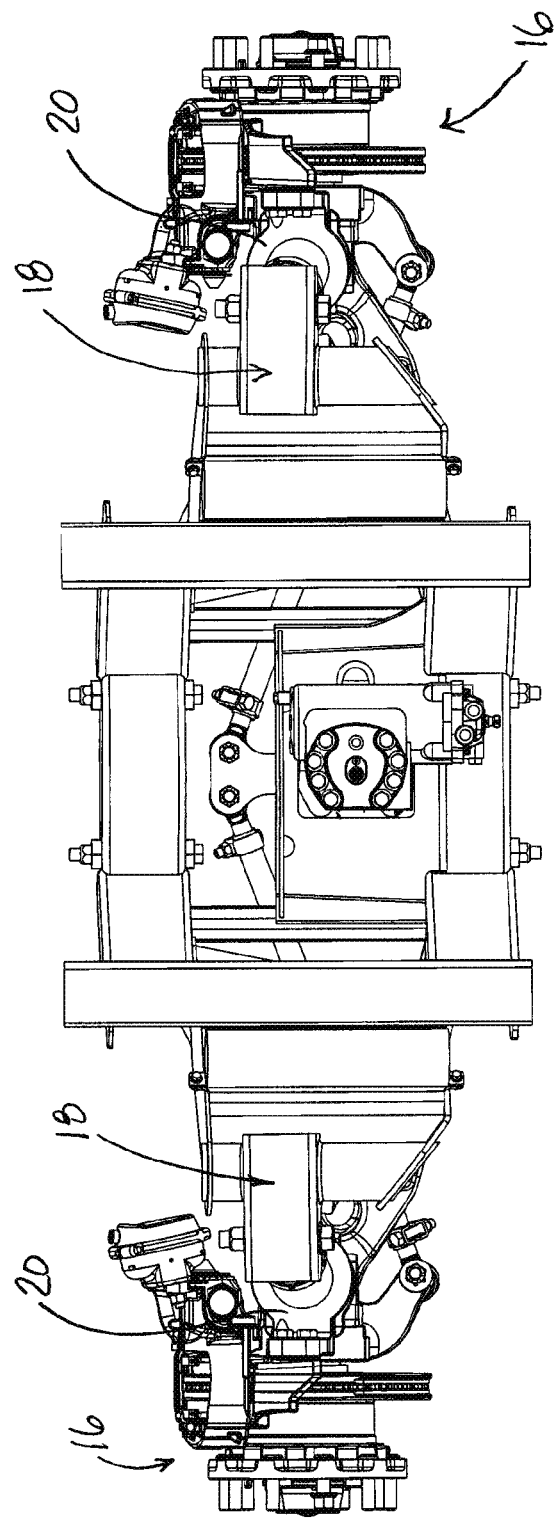
FIG. 2 is a top view of the vehicle suspension of FIG. 1.
Figure 3:
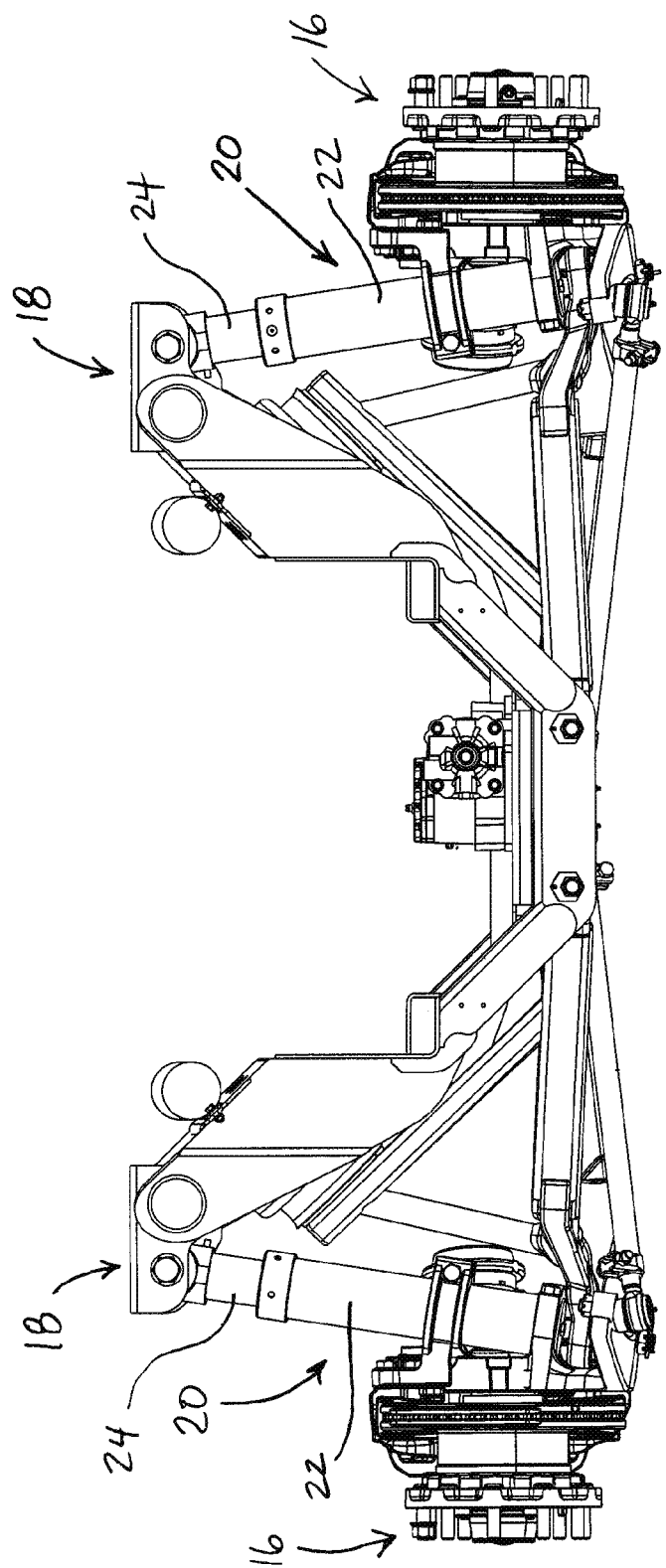
FIG. 3 is a front view of the vehicle suspension of FIG. 1.
Figure 4:
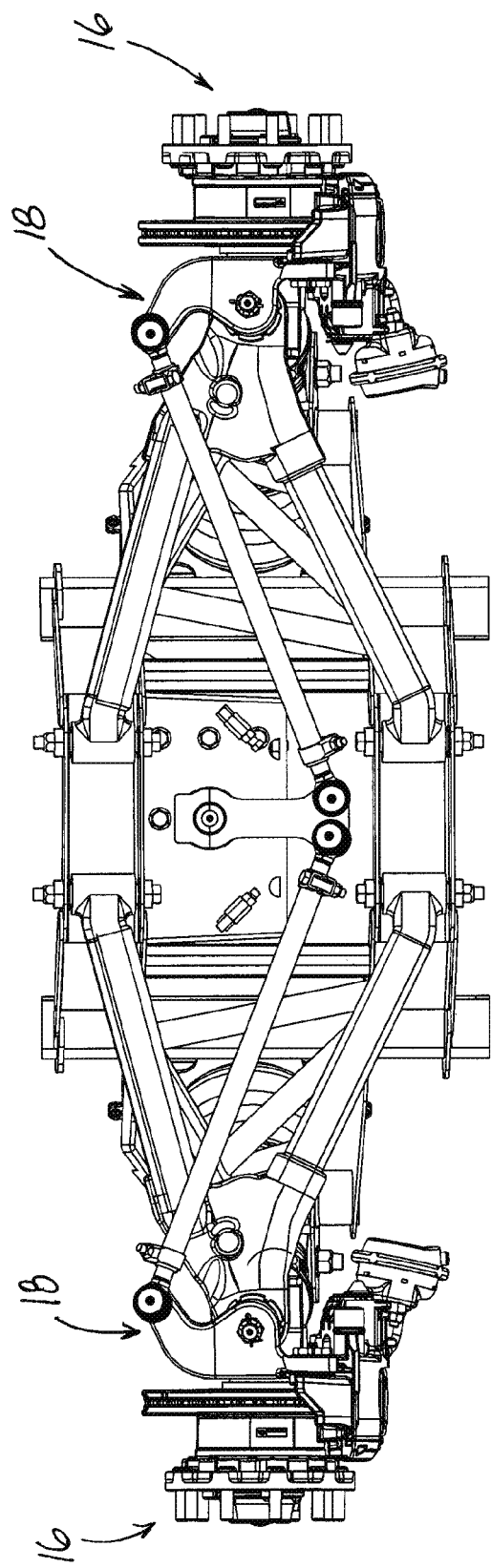
FIG. 4 is a bottom view of the vehicle suspension of FIG. 1.
Figure 5:
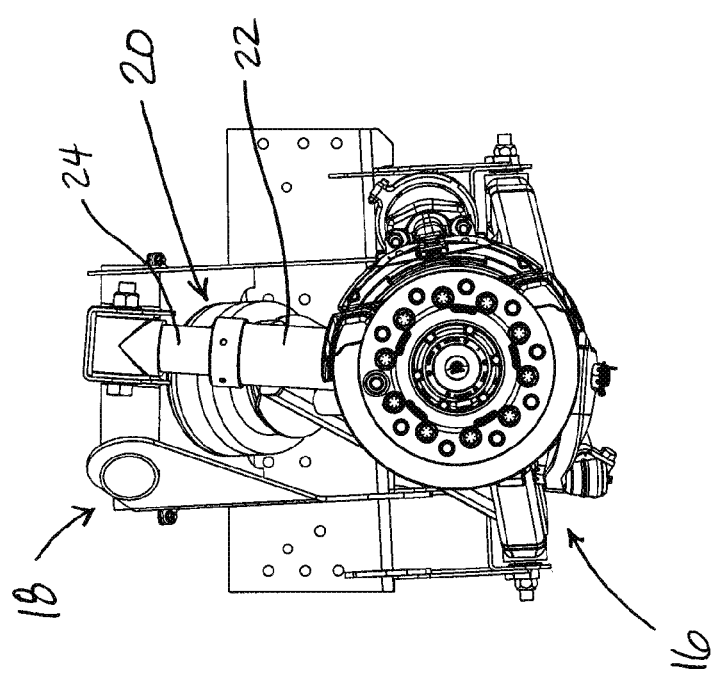
FIG. 5 is a left side view of the vehicle suspension of FIG. 1.

The present strut assembly provides both a dampening effect and a spring effect to absorb shock impulses generated during operation of a device, and more specifically, during the operation of a vehicle.

Referring now to FIGS. 1-9, the present strut assembly is associated with the vehicle suspension and is attached between the wheel assembly 16 and the frame 18 to reduce vibrations and shock impulses on the vehicle frame generated by driving the vehicle on uneven road or terrain, or changing the direction of the vehicle. Reducing the vibrations and shock impulses on the vehicle frame and body reduces rocking, pitching, diving and swaying of the vehicle while driving, and improves contact and traction with the road.

The present strut assembly is generally indicated as reference number 20, and has a first cylinder or base cylinder 22 and a second cylinder or working cylinder 24 that slidingly, reciprocally moves within the first cylinder 22. Specifically, the first cylinder 22 has a first outer diameter and a first inner dimeter and the second cylinder 24 has a second outer diameter and a second inner diameter where the second outer diameter is less than the first inner diameter so that the second cylinder 24 fits within and moves relative to the first cylinder 22. The diameter and length of the first and second cylinders 22, 24 depends on the magnitude of the shock impulses and vibrations required to be absorbed by the strut assembly 10 for a particular operation, such as driving off road on uneven terrain. It should be appreciated that the first and second cylinders 22, 24 may be any suitable size and length. In the illustrated embodiment, the first and second cylinders 22, 24 are made of metal, such as aluminum, and may also be made with other suitable materials, such as a composite material, or a combinations of materials.

The first cylinder 22 has a hollow interior with opposing open ends 26, 28. One end 26 of the first cylinder 22 has an end cap 30 attached to the first cylinder by an annular tab 32 on the inner surface 34 of the end cap 30 that engages a corresponding groove 36 formed on the outer surface 38 of the first cylinder. Alternatively, the end cap 30 includes threads on the inner surface 34 that engage corresponding threads formed on the outer surface 38 of the first cylinder. A through-hole 40 is formed in the center of the end cap 30 and is configured to receive the second cylinder 24, such that the second cylinder 24 slidingly moves relative to the first cylinder 22.

The opposing end 28 of the first cylinder 22 is closed by an end plate 42, which includes outer threads that engage threads formed on an inner surface 72 of the first cylinder 22 at this end. In the illustrated embodiment, an inner portion of the end plate 42 includes a groove 44 that is configured to receive a seal member, such as o-ring 46, that forms a seal between the end plate 42 and the inner surface 34 of the first cylinder 22. It should be appreciated that the end plate 42 may be attached to the end of the first cylinder 22 by welding or other suitable attachment method.

Figure 8:
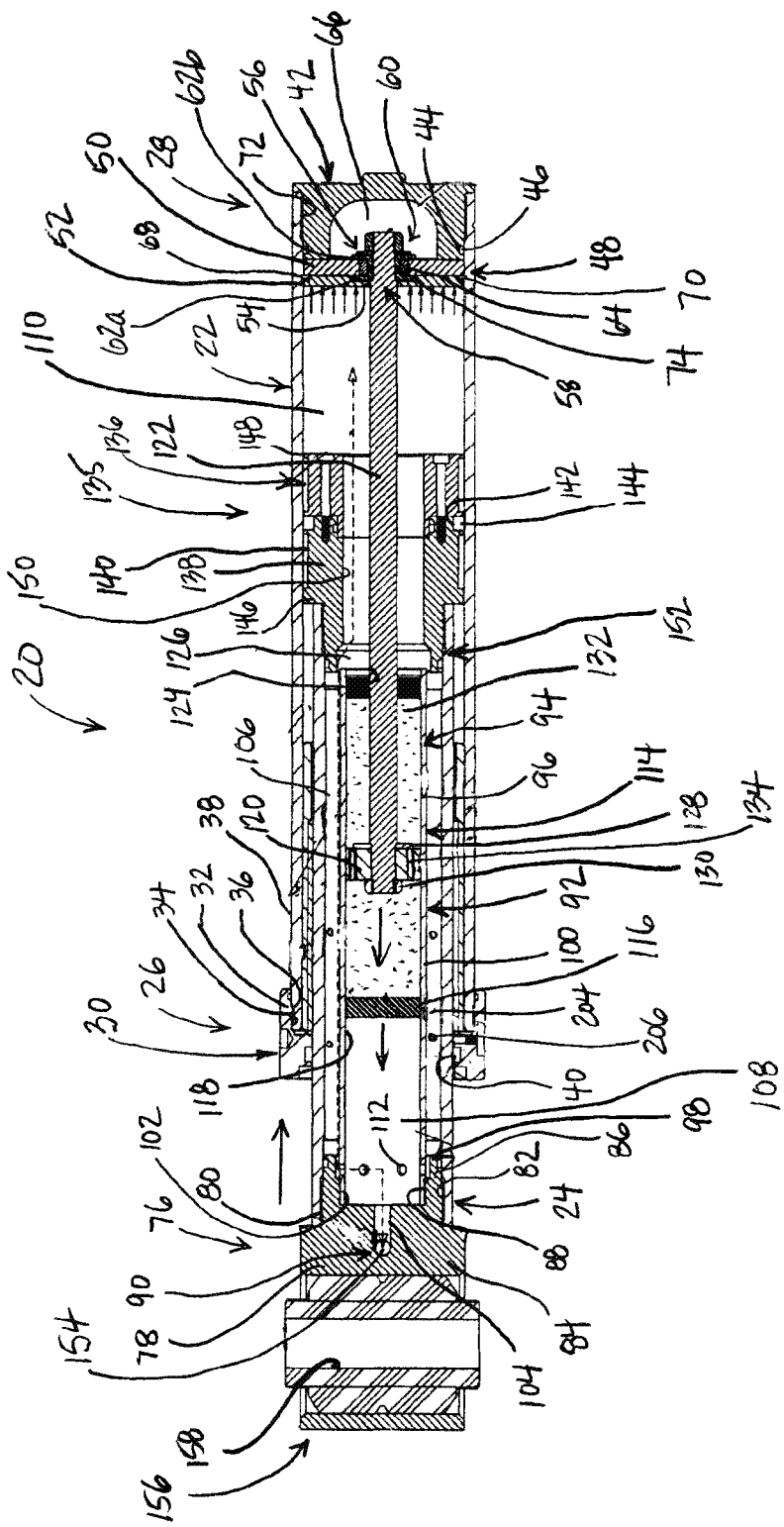
FIG. 8 is a cross-section view of the present strut assembly taken substantially along line 8-8 in FIG. 7 in the direction generally indicated, where the strut assembly is in a compression cycle.

A connecting plate assembly 48 is positioned adjacent to the end plate 42 and includes an inner connecting plate 50 and an outer connecting plate 52. The outer connecting plate 52 is positioned adjacent to the end plate 42 and includes a central through-hole 54. A cylindrical connector 56 having opposing ends 58, 60 is positioned in the through-hole 54 where the opposing ends each have flanges 62a, 62b that extend along opposing sides of the outer connecting plate 52 to maintain the connector 56 in place relative to the outer connecting plate 52. A bearing ring 64 is placed around the outer connecting plate 52 between the flanges 62a, 62b on the ends of the connector. As shown in FIG. 8, the through-hole 54 of the outer connecting plate 52 extends to a hollow area 66 within the end plate 42. Similarly, the inner connecting plate 50 is positioned adjacent to the outer connecting plate 52 and is secured to the first cylinder 22 by a cylindrical ring 68 that engages corresponding groove 70 formed in the inner surface 72 of the first cylinder 22 and the inner connecting plate 50. This connection secures the connecting plate assembly 48 to the end of the first cylinder 22, where the inner connecting plate 50 has a through-hole 74 that is aligned and co-axial with the through-hole 54 in the outer connecting plate 52 and the hollow area 66.

Figure 6:
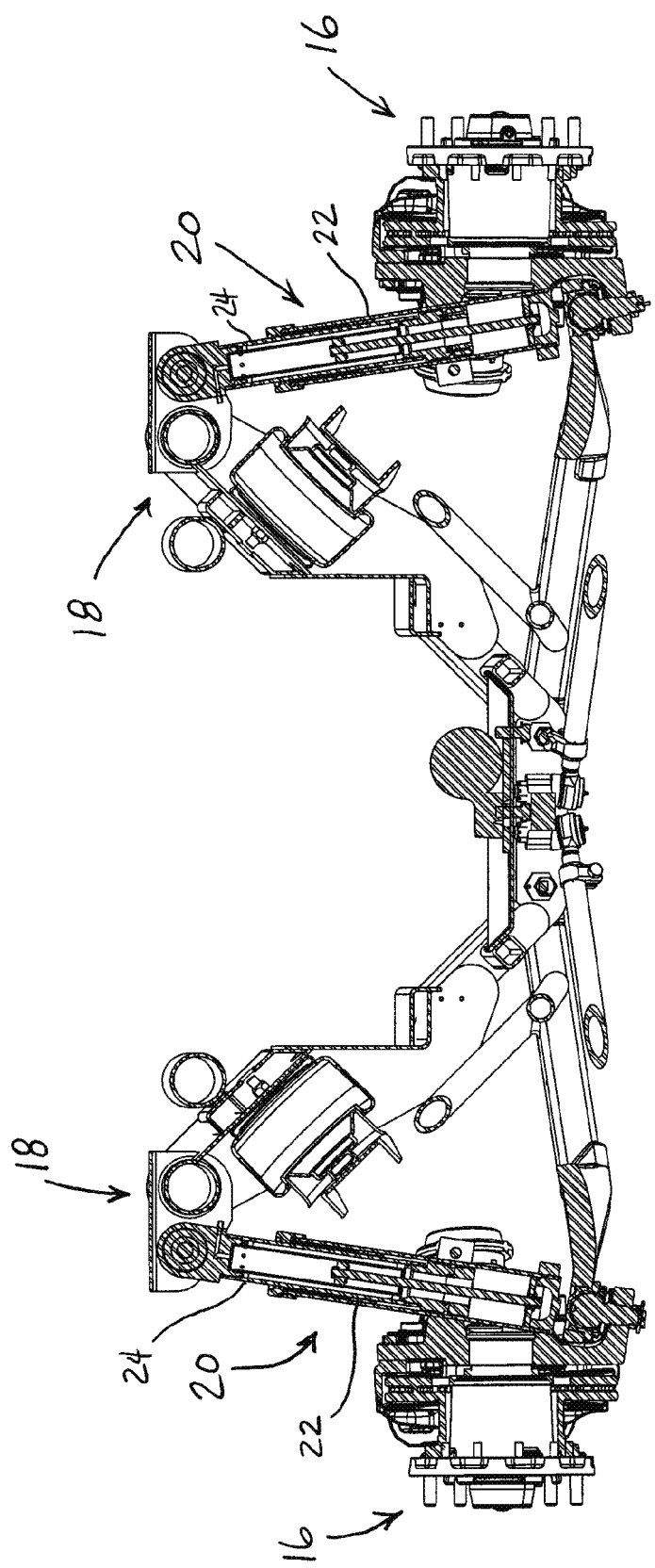
FIG. 6 is a cross-section view of the vehicle suspension substantially along line 6-6 of FIG. 1 in the direction generally indicated.

Referring to FIGS. 6 and 8, an outer end 76 of the second cylinder 24 includes an end plate 78 having an outer surface 80 with threads that engage corresponding threads formed on the inner surface 82 of the second cylinder 24. The end plate 78 includes a top portion having an outwardly extending flange 84 that engages the end 76 of the second cylinder 24 and an inwardly extending wall 86 that extends at least partly along and engages the inner surface 82 of the second cylinder. A central receptacle 88 and a pressure equalization port 90 are formed in the end plate 78 where the port 90 is in communication with a reservoir storing a pressurized gas as described below. It should be appreciated that the reservoir is formed in the end plate 42 or is within the strut assembly 20 to eliminate the need for a burdensome, separate, remote reservoir, tank or cartridge connected to the strut assembly.

To dampen the vibrations transferred to the vehicle frame 18, the strut assembly 20 includes a damper assembly 92 positioned inside the second cylinder 24. More specifically, as shown in FIG. 8, the damper assembly 92 includes a housing 94 having a sidewall 96 where one end 98 of the housing 94 is inserted in the receptacle 88 formed in the end plate 78 and includes threads on an outer surface 100 that engage threads formed on the inner surface 102 of the receptacle 88. This end 98 of the housing 94 also includes a through-hole 104 that is aligned with and in communication with the port 90 in the end plate 78.

Figure 9:
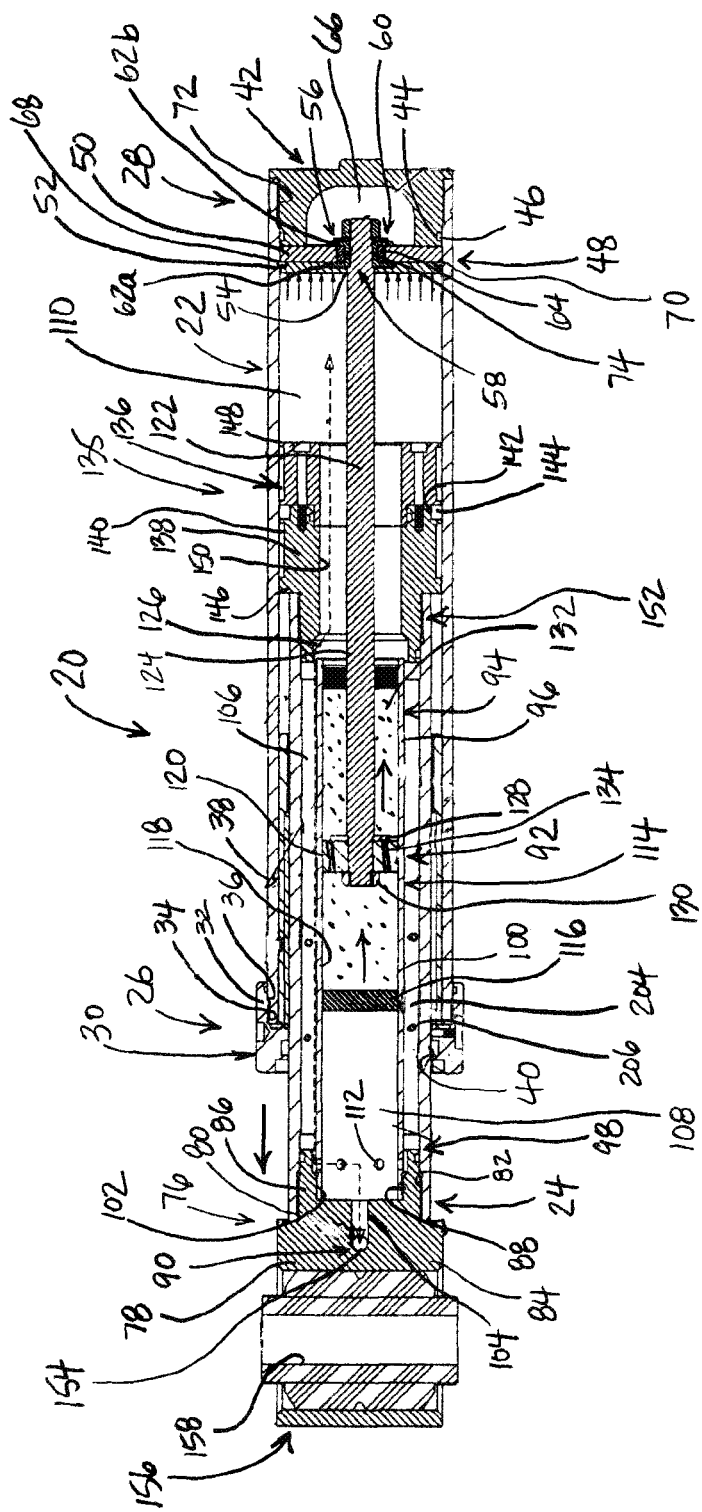
FIG. 9 is the cross-section view of the present strut assembly of FIG. 8 showing the strut assembly in a compression cycle.

An annular flow channel 106 is formed between the housing 94 of the damper assembly 92 and the second cylinder 24 by forming the housing 94 with an outer diameter that is smaller than the inner diameter of the second cylinder 24. The flow channel 106 enables pressurized gas to flow between an interior chamber 108 inside the housing 94 to an outer chamber 110 formed between the first and second cylinders 22, 24 as shown in FIGS. 8 and 9. Specifically, a plurality of holes 112 are formed at the end 98 of the housing 94 to connect the interior chamber 108 and the flow channel 106. The size, i.e., diameter, of the holes is predetermined based on the desired gas flow rate between the interior and outer chambers 108, 110 and the pressure to be maintained in the interior and outer chambers 108, 110. It should be appreciated that one or more holes 112 may be formed in the housing 94.

As shown in the Illustrated embodiment, the interior space of the housing 94 is divided into a first chamber, i.e., the interior pressure chamber 108, and a second chamber 114 by a floating piston 116. The floating piston 116 has an outer diameter that is smaller than the inner diameter of the housing 94 so that the floating piston forms a seal with the inner surface 118 of the housing 94 while moving relative to the housing. The first or interior chamber 108 includes holes 112 and has a first volume pressurized with a gas, such as Nitrogen or other suitable gas, via the port 90 as described in more detail below. In an embodiment, the pressure of the gas inside the strut assembly 20 is 300 to 400 psi but may be any suitable pressure. The second chamber 114 includes a second volume and a damper piston 120 that is attached to an end of a piston rod 122 by threads, welding or other suitable connection method. The piston rod 122 extends through a through-hole 124 formed in housing end plate 126 attached to the housing 94 and also through the inner and outer connecting plates 50, 52 on the first cylinder 22. The end of the piston rod 122 is secured to the end plate 78 by a washer 128 and nut 130 threaded onto the end of the piston rod. Securing the piston rod 122 to the second cylinder 24 secures the piston rod 122 and piston 120 in place within housing 94 while the housing 94 moves in unison with the second cylinder (and relative to the piston 120 and the piston rod 122) thereby changing the position of the piston 120 within the housing 94.

The housing 94 of the damper assembly 92, and more specifically, the second chamber 114 of the housing, is filled with a non-compressible fluid, such as hydraulic oil 132. The hydraulic oil 132 provides resistance to the movement of the piston 120 in the second chamber 114 to dampen or reduce the vibrations on the strut assembly 20. Since the hydraulic oil 132 is not compressible, the floating piston 116 moves within the housing 94 to account for the expansion and the reduction of the volume in the housing 94 due to the volume of the hydraulic oil 132 in the second chamber that is displaced by the piston rod 122 as the piston rod moves into and out of the interior of the housing 94 during shock absorption. For example, the floating piston 116 moves toward the end 98 of the housing 94 when the piston rod 122 moves into the housing 94 during a compression cycle of the strut assembly 20, i.e., when the first cylinder 22 is compressed or moves into the second cylinder 24, to expand the volume of the second chamber 114 and account for the amount of the volume taken up by the piston rod. Alternatively, the floating piston 116 moves toward the piston 120 as the piston rod 122 moves out of the housing 94 to account for the change in volume due to the piston rod moving out of the housing 94.

The amount of dampening provided by the damper assembly 92 is controlled by through-holes 134 formed in the piston 120 of the damper assembly. As the piston 120 moves within the housing 94, the hydraulic oil 132 moves between the first and second chambers 108, 114 through the through-holes 134 formed in the piston. Therefore, the amount of resistance on the piston 120 by the hydraulic oil 132 is determined by the diameter of the through-holes 134 in the piston 120. For example, through-holes having a smaller diameter allow less of the hydraulic oil 132 to pass through the through-holes during movement of the piston 120 within the housing 94 thereby creating more resistance to the movement of the piston 120. Alternatively, through-holes with a larger diameter allow more hydraulic fluid 132 to pass between the first and second chambers 108, 114 to provide less resistance to the movement of the piston 120.

As shown in FIG. 8, an inner end 135 of the second cylinder 24 includes a strut piston 136 having a body 138 with a stepped annular shape where a first outer diameter of the body 138 is less than the inner diameter of the first cylinder 22. More specifically, an outer surface 140 of the body 138 has a groove 142 and a seal ring 144, such as an o-ring, positioned in the groove 142, along with outwardly extending upper and lower flanges 146, 148, that each engage and form a seal with the inner surface 72 of the first cylinder 22. Further, the body 138 has a second outer diameter that is smaller than the first outer diameter and smaller than the inner diameter of the second cylinder 24 such that the portion of the body 136 having the second outer diameter extends at least partly within the second cylinder 24. To allow the pressurized gas to flow between the interior chamber 108 and the outer chamber 110, the body 138 includes a central through-hole 150 extending between the ends of the body. Additionally, the inner diameter of the end 152 of the body 138 is greater than the outer diameter of the housing 94 to form a gap or space between the body 138 and the housing 94 so that the pressurized gas is able to flow between the housing 94 and the strut piston 136, through the central through-hole 150 and into the outer chamber 110.

The pressured gas supplied to the strut assembly 20 is preferably Nitrogen gas but may be another suitable gas, and is filled or supplied to the housing 94 of the second cylinder 24 from a reservoir 154 through the port 90 where the reservoir is within the strut assembly 20, and is not supplied from a remote tank, pressurized cartridge or other separate, pressurized container. The pressurized gas fills the interior chamber 108, and the outer chamber 110 by flowing through the holes 112 in the housing 94, through the flow channel 106, through the central through-hole 150 and into the outer chamber. The pressure of the pressurized gas is maintained at a pre-determined, constant pressure within the strut assembly 20. Therefore, when the floating piston 116 moves toward the holes 112 in the housing 94 in a compression cycle, the pressurized gas within the interior chamber 108 is forced out through the holes due to the reduction in volume in the interior chamber and increase in volume in the outer chamber 110, and into and through the flow channel 106 and into the outer chamber 110 due to the pre-determined, constant pressure of the pressurized gas maintained within the strut assembly 20. Furthermore, the constant pressure of the gas on the floating piston 116 maintains pressure on the hydraulic oil 132 in second chamber 114 to prevent foaming and cavitation of the hydraulic oil due to separation of air molecules in the hydraulic oil during the repeated compression and expansion/extension of the second cylinder 24 relative to the first cylinder 22

Alternatively, in an expansion cycle, the second cylinder 24 moves out of the first cylinder 22 due to the flow of the pressurized gas into the outer chamber 110, which causes the strut piston 136 to move away from the end 28 of the first cylinder 22. As the piston rod 122 moves out of the housing 94, the constant pressure of the gas in the interior chamber 108 and the reservoir 154 causes the floating piston 116 to move toward the damper piston 120.

Figure 7:
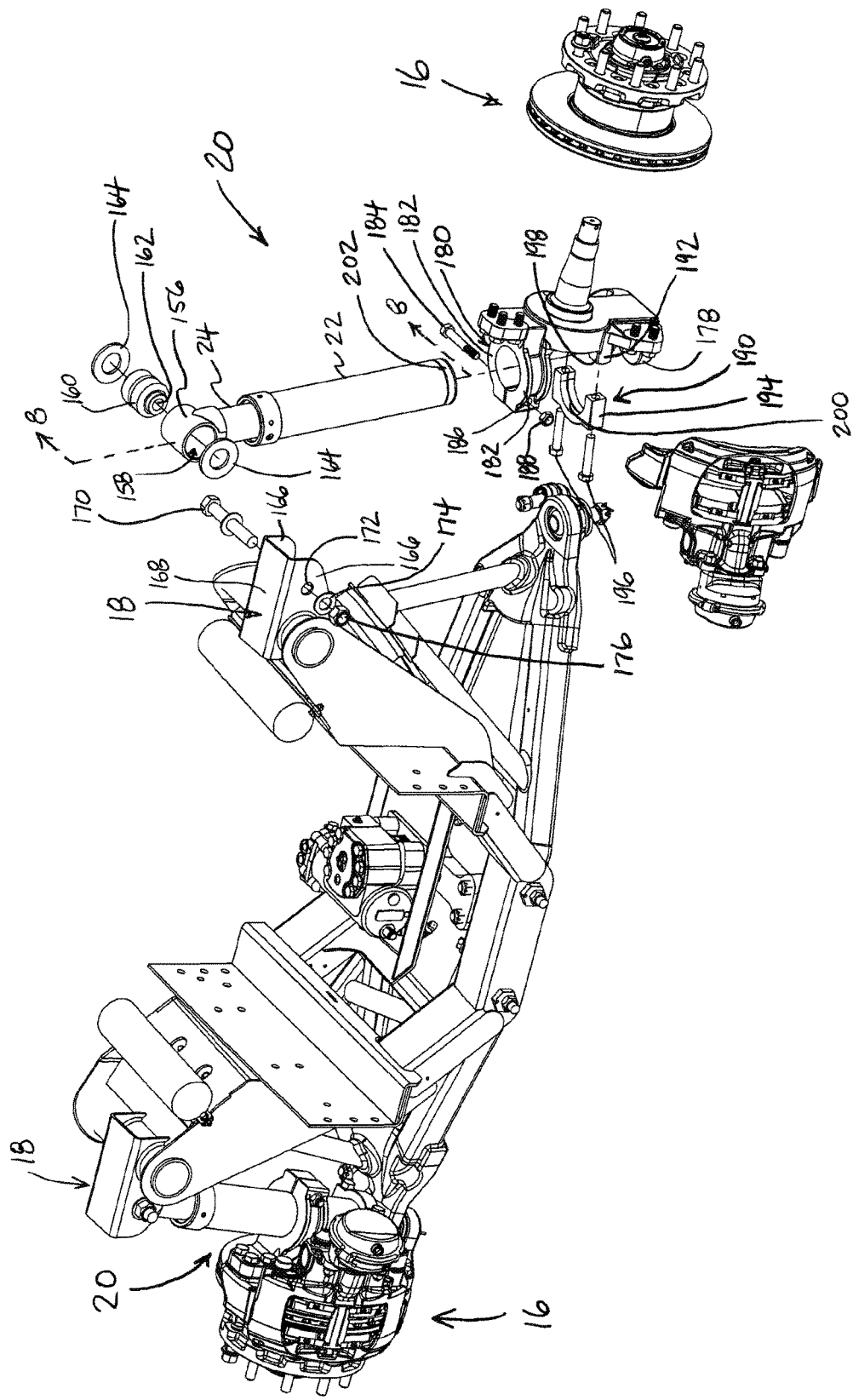
FIG. 7 is a partially exploded front perspective view of the vehicle suspension of FIG. 1.

As shown in FIGS. 1, 7 and 8, the end of the first cylinder 22 includes a cylindrical connector 156 with a through-hole 158. A bushing 160 having a central through-hole 162 is mounted within the through-hole 158 of the connector 156. A pair of washers 164 are placed on opposing sides of the connector 156 and the connector is inserted between the flanges 166 on the clevis member 168 of the vehicle frame 16. A threaded bolt 170 is inserted through holes 172 in the clevis member 168, the washers 164 and the central through-hole 162 of the bushing 160, and secured in place by attaching a washer 174 and lock nut 176 to the end of the bolt 170. To reduce wear or failure of the strut assembly 20, the bushing 160 allows for the end of the strut assembly 20 to pivot or rotate relative to the clevis member 168 to account for lateral movement of the wheel assembly 18.

Referring to FIGS. 1 and 7, the lower portion of the strut assembly 20 is positioned on a support plate 178 of the wheel assembly 18 and is secured to the wheel assembly by a pinch clamp 180 mounted on the wheel assembly 18 that includes opposing c-shaped arms 182 that are secured together at corresponding ends by a bolt 184 inserted through through-holes 186 and a nut 188. The inner diameter of the pinch clamp 180 is greater than the outer dimeter of the first cylinder 22 such that the first cylinder 22 is inserted through the pinch clamp 180 and positioned on the support plate 178. The nut 188 is then tightened on the bolt 184 to cause the ends of the c-shaped arms 182 to move toward each other and engage the outside surface of the first cylinder 22.

The first cylinder 22 is further secured to the wheel assembly 18 by snap ring 190. The snap ring 190 includes a first c-shaped member 192 attached to or integrally formed on the wheel assembly 18 that has an inner diameter that corresponds to the outer diameter of the first cylinder 22. A separate, second c-shaped member 194 having an inner diameter corresponding to the outer diameter of the first cylinder 22 is positioned on the outer surface of the first cylinder 22 and secured to the first c-shaped member 192 by two bolts 196 inserted through holes in the second c-shaped member 194 and threaded into receptacles 198 on the first c-shaped member 192. The snap ring 190 further includes a protruding annular member 200 that engages a corresponding annular groove 202 formed in the outer surface 38 of the first cylinder 22 to further secure the strut assembly 20 to the wheel assembly 18.

In operation, during vibrations or shock impulses generated during the engagement of the wheel assembly 18 with uneven surfaces of underlying terrain or roads, the strut assembly 20 moves between compression cycles and extension cycles. In a compression cycle, a bump or other uneven surface generates vibrations and/or shock impulses on the wheel assembly 18 that cause the wheel assembly 18 to move toward or into the vehicle frame 16 and thereby, the second cylinder 24 to be compressed or move into the first cylinder 22. To absorb such vibrations and shock impulses, the present strut assembly 20 employs the combination of a compressed gas spring and a damper assembly.

Specifically, during a compression cycle shown in FIG. 8, the second cylinder 24 moves into the first cylinder 22 causing the damper piston 120 and piston rod 122 to move into the housing 94 of the damper assembly 92. As the piston 120 and piston rod 122 move in the housing 94, the hydraulic oil 132 in the housing resists the movement of the piston 120 to dampen the shock impulses on the strut assembly. At the same time, the floating piston 116 moves toward the holes 112 in the housing 94 to account for the volume of the hydraulic oil 132 displaced by the piston rod 122 moving into the housing 94. The hydraulic oil 132 in the housing 94 therefore provides a designated resistance on the damper piston 120 to dampen the vibrations or shock impulses transferred to the strut assembly 20. As the floating piston 116 moves toward the holes 112, the pressurized gas, i.e., pressurized Nitrogen, in the interior chamber 108 maintains a constant pressure on the floating piston 116 and thereby, the hydraulic oil 132, to minimize foaming and cavitation (separation of air molecules) in the hydraulic oil to improve the working life and effectiveness of the strut assembly 20. The constant pressure of the pressurized gas in the interior chamber 108, the flow channel 106 and the outer chamber 110 creates a spring force on the end of the first cylinder 22 as shown by the series of arrows in FIG. 8 to further enhance the shock absorption of the strut assembly 20.

In the extension or rebound cycle, the extension of the strut assembly 20, i.e., the movement of the second cylinder 24 out of the first cylinder 22, is controlled by the damper assembly 92. As the pressure of the pressurized gas in the outer chamber 110 pushes against the strut piston 136 to cause the second cylinder 24 to move outwardly from the first cylinder 22, the resistance of the hydraulic oil 132 on the damper piston 120 controls the outward movement of the second cylinder 24 relative to the first cylinder 22. The repeated extension and rebound cycles of the strut assembly 20 converts the kinetic energy of the vibrations and shock impulses into thermal energy in the hydraulic oil 132, which is transferred to the atmosphere through the sidewall of the second cylinder 24 and through the vent openings 206 in the vent areas 204.

Thus, the combination of the dampening effect of the damper assembly 92 and the spring effect of the pressurized gas absorbs the vibrations and/or shock impulses on the vehicle frame 16 generated by the engagement of the wheel assembly 18 with uneven terrain and roads to improve the handling and smoothness of the ride of the vehicle.

Figure 10:
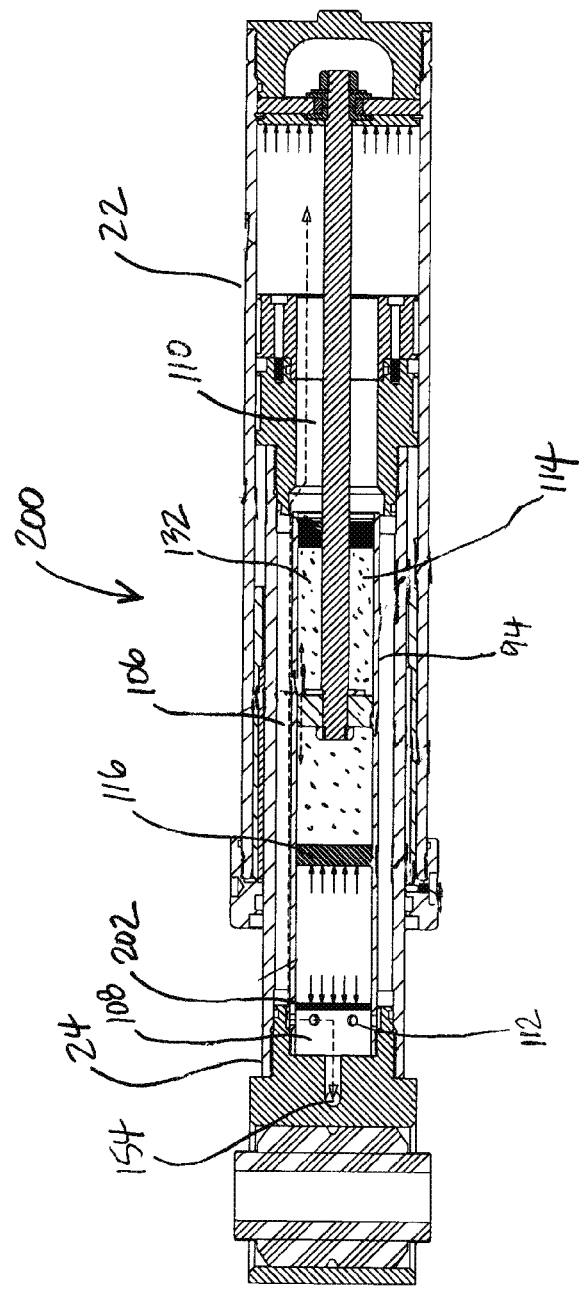
FIG. 10 is the cross-section view of another embodiment of the present strut assembly where the strut assembly includes a separated, pressurized chamber resent strut assembly.

Referring now to FIG. 10, in another embodiment, the strut assembly 200 includes the same components described above that are designated by the same reference numbers except that a divider plate 202 is positioned between the holes 112 in the interior chamber 108 of the housing 94 and the floating piston 116 and fixed to the inner surface 118 of the housing 94. The divider plate 202 seals a charge of pressurized gas, i.e., Nitrogen gas, between the divider plate 202 and the floating piston 116 to provide a constant designated pressure against the floating piston 116 and the hydraulic oil 132 in the second chamber 114. In this embodiment, pressurized Nitrogen gas also flows between the reservoir 154, the interior chamber 108, the flow channel 106 and the outer chamber 110 as described above to provide pressure in the outer chamber 110 that generates the spring effect for absorbing the vibrations and shock impulses and to return the second cylinder 24 to the extended position relative to the first cylinder 22. It should be appreciated that the divider plate 202 may be secured at any position between the holes 112 and the floating piston 116 within the housing 94.

While particular embodiments of the present strut assembly have been shown and described, it will be appreciated by those skilled in the art that changes and modifications may be made thereto without departing from the invention in its broader aspects and as set forth in the following claims.

What is claimed is:
1. A strut assembly comprising:
a first cylinder;
a second cylinder configured to reciprocally move within said first cylinder;
a damper assembly positioned within said second cylinder, said damper assembly including a housing having opposing first and second ends, a floating piston in said housing and a damper piston positioned between said floating piston and said first end of said housing, said damper piston dividing said housing into first and second chambers, said first and second chambers including a hydraulic fluid that provides resistance to the movement of said damper piston in said housing; and a gas spring in said first and second cylinders, wherein said gas spring includes a pressurized gas contained within said first and second cylinders.

2. The strut assembly of claim 1, further comprising an interior chamber in said housing between said floating piston and said second end of said housing, said interior chamber being charged with said pressurized gas.

3. The strut assembly of claim 2, further comprising a flow channel between said housing and an inner surface of said second cylinder, and an outer chamber in said first cylinder, wherein said interior chamber is in communication with said flow channel.

4. The strut assembly of claim 2, further comprising a plurality of holes formed in said interior chamber, and an outer chamber in said first cylinder, said plurality of holes being in communication with said interior chamber and said outer chamber.

5. The strut assembly of claim 1, wherein said hydraulic fluid is hydraulic oil.

6. The strut assembly of claim 1, wherein said pressurized gas is Nitrogen gas.

7. The strut assembly of claim 1, further comprising an equalization pressure port in one of said first and second cylinders and configured to supply the pressurized gas to said first and second cylinders.

8. The strut assembly of claim 1, wherein said damper piston includes at least two holes extending between said first and second chambers.

9. A vehicle suspension comprising:
a frame and a wheel assembly associated with said frame;
a strut assembly attached to said frame and said wheel assembly, said strut assembly including:
a first cylinder;
a second cylinder configured to reciprocally move within said first cylinder;
a damper assembly positioned within said second cylinder, said damper assembly including a housing and a floating piston that reciprocally moves within said housing;
a gas spring in said second cylinder, wherein said gas spring includes a pressurized gas contained within said second cylinder.

10. The vehicle suspension of claim 9, wherein said housing of said damper assembly has opposing first and second ends, said damper assembly further comprising a damper piston positioned between said floating piston and said first end of said housing, said damper piston dividing said housing into first and second chambers, said first and second chambers including a hydraulic fluid that provides resistance to the movement of said damper piston in said housing.

11. The vehicle suspension of claim 10, further comprising an interior chamber in said housing between said floating piston and said second end of said housing, said interior chamber being charged with said pressurized gas.

12. The vehicle suspension of claim 11, further comprising a flow channel between said housing and an inner surface of said second cylinder, and an outer chamber in said first cylinder, wherein said interior chamber is in communication with said flow channel.

13. The vehicle suspension of claim 12, further comprising a plurality of holes formed in said interior chamber, and an outer chamber in said first cylinder, said plurality of holes being in communication with said interior chamber and said flow channel.

14. The vehicle suspension of claim 10, wherein said hydraulic fluid is hydraulic oil.

15. The vehicle suspension of claim 10, wherein said pressurized gas is Nitrogen gas.

16. The vehicle suspension of claim 9, further comprising an equalization pressure port in one of said first and second cylinders and configured to supply the pressurized gas to said first and second cylinders.

17. The vehicle suspension of claim 10, further comprising a strut piston attached to said second cylinder, wherein a gap is formed between said strut piston and said housing.

18. The strut assembly of claim 9, wherein said damper assembly includes a damper piston having at least two holes extending between said first and second chambers.

19. A vehicle suspension comprising:
a frame and a wheel assembly associated with said frame;
a strut assembly attached to said frame and said wheel assembly, said strut assembly including:
a first cylinder;
a second cylinder configured to reciprocally move within said first cylinder;
a damper assembly positioned within said second cylinder, said damper assembly including a housing having opposing first and second ends, a floating piston in said housing and a damper piston positioned between said floating piston and said first end of said housing, said damper piston dividing said housing into first and second chambers, said first and second chambers including a hydraulic fluid that provides resistance to the movement of said damper piston in said housing; and
a gas spring in said first and second cylinders, wherein said gas spring includes a pressurized gas contained within said first and second cylinders.

20. The vehicle suspension of claim 19, further comprising an interior chamber in said housing between said floating piston and said second end of said housing, said interior chamber being charged with said pressurized gas.

* * * * *